United States Patent
Miura et al.

(12) 
(10) Patent No.: US 6,733,259 B2
(45) Date of Patent: May 11, 2004

(54) TIRE VULCANIZING MOLD

(75) Inventors: Masaru Miura, Tokyo (JP); Hiroyuki Isoi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 155 days.

(21) Appl. No.: 10/085,095

(22) Filed: Mar. 1, 2002

(65) Prior Publication Data

US 2002/0122837 A1 Sep. 5, 2002

(30) Foreign Application Priority Data

Mar. 5, 2001 (JP) ........................................ 2001-060080

(51) Int. Cl.[7] ................................................. B29C 35/02
(52) U.S. Cl. .......................................... 425/46; 425/47
(58) Field of Search ....................................... 425/46, 47

(56) References Cited

U.S. PATENT DOCUMENTS

| | | | | |
|---|---|---|---|---|
| 2,333,588 A | * | 11/1943 | Schaevitz | 425/46 |
| 3,082,480 A | * | 3/1963 | Balle | 425/46 |
| 4,035,119 A | * | 7/1977 | Beres et al. | 425/46 |
| 5,190,767 A | * | 3/1993 | Beres et al. | 425/46 |
| 5,290,163 A | * | 3/1994 | Katsumata et al. | 425/47 |
| 6,408,910 B1 | * | 6/2002 | Lagnier et al. | 425/46 |

FOREIGN PATENT DOCUMENTS

JP 4-319410 * 11/1992 .................. 425/46

\* cited by examiner

*Primary Examiner*—James P. Mackey
(74) *Attorney, Agent, or Firm*—Oliff & Berridge, PLC

(57) ABSTRACT

A vulcanizing mold for a pneumatic tire wherein the tread portion includes a center region and outer regions on both sides thereof. The mold includes a pair of side mold members movable toward each other defining part of a mold cavity for vulcanizing a green tire, and away from each other allowing setting of the green tire into the mold cavity and remove of a vulcanized tire out of the mold cavity. Each side mold member has inner peripheral surface with ridges for forming grooves in the outer region of the tread portion. The ridges of the side mold members extend in parallel with each other, as seen in a developed view of the inner peripheral surface of the side mold member, and terminate at positions corresponding to a tread end of the tire so that the grooves formed by these ridges are opened in the tread end. A plurality of distance piece are arranged axially between the side mold members and movable radially of the mold so as to be assembled with each other to form an inner peripheral surface with a ridge that forms a groove in the center region of the tread portion.

9 Claims, 7 Drawing Sheets

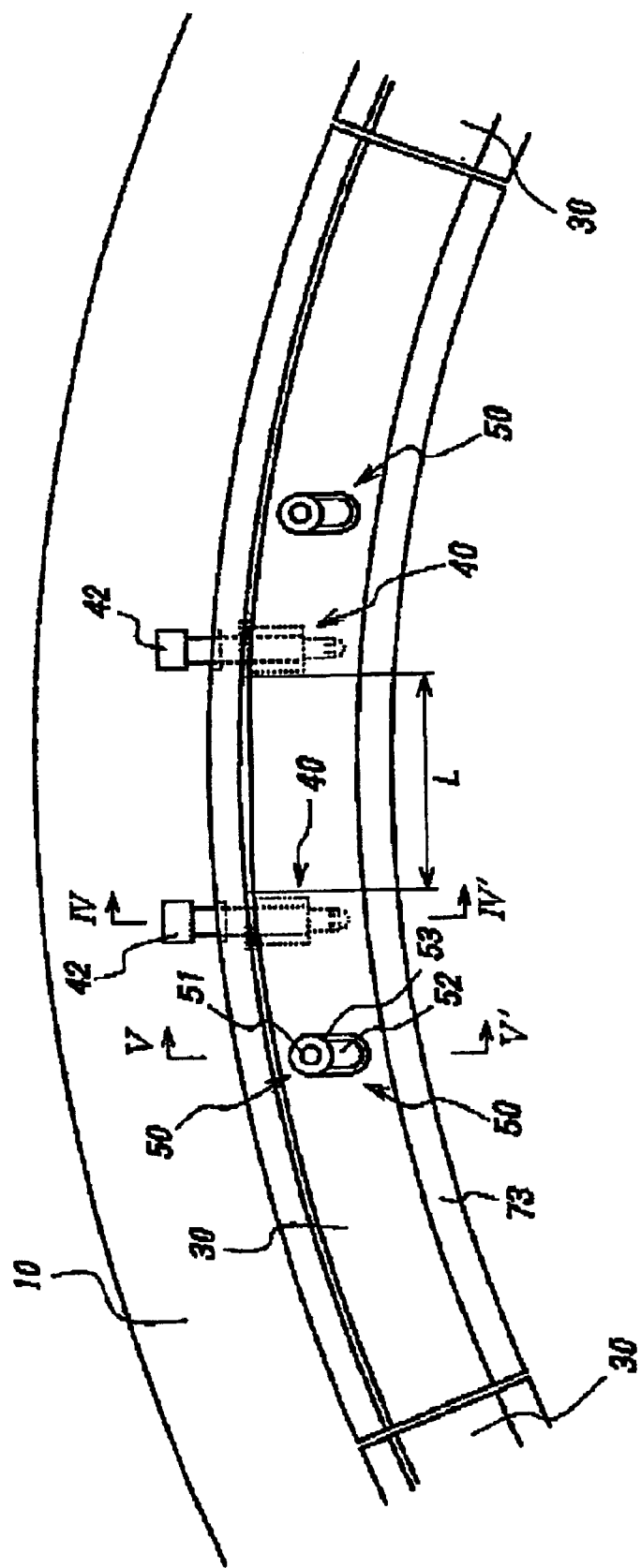

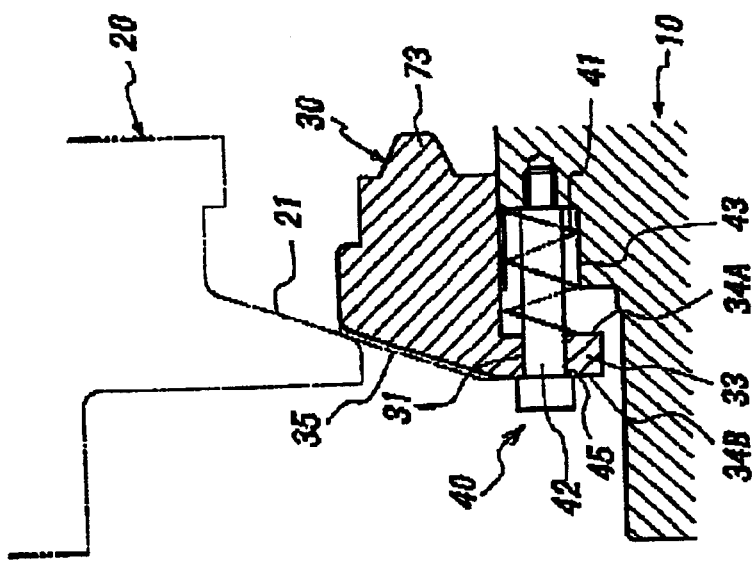
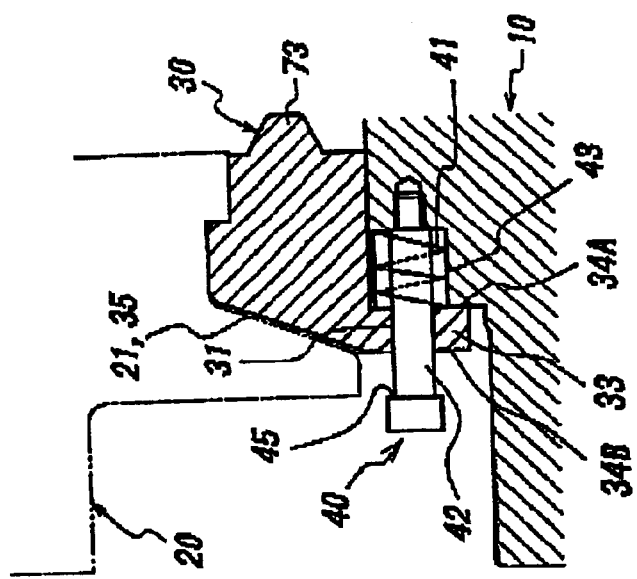

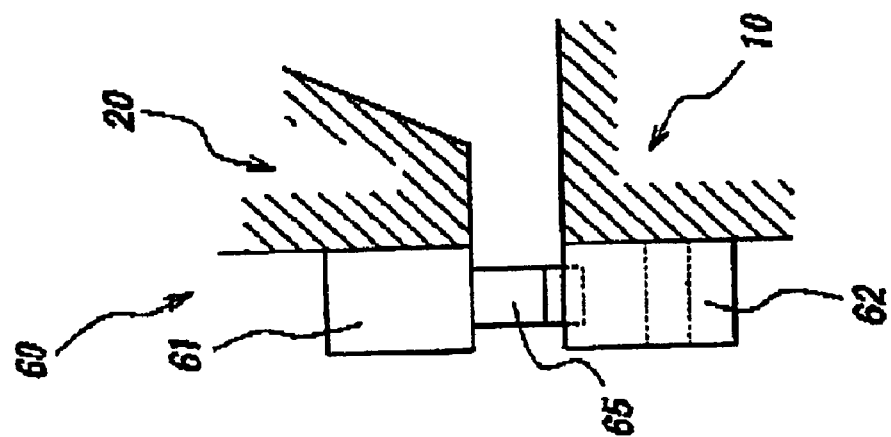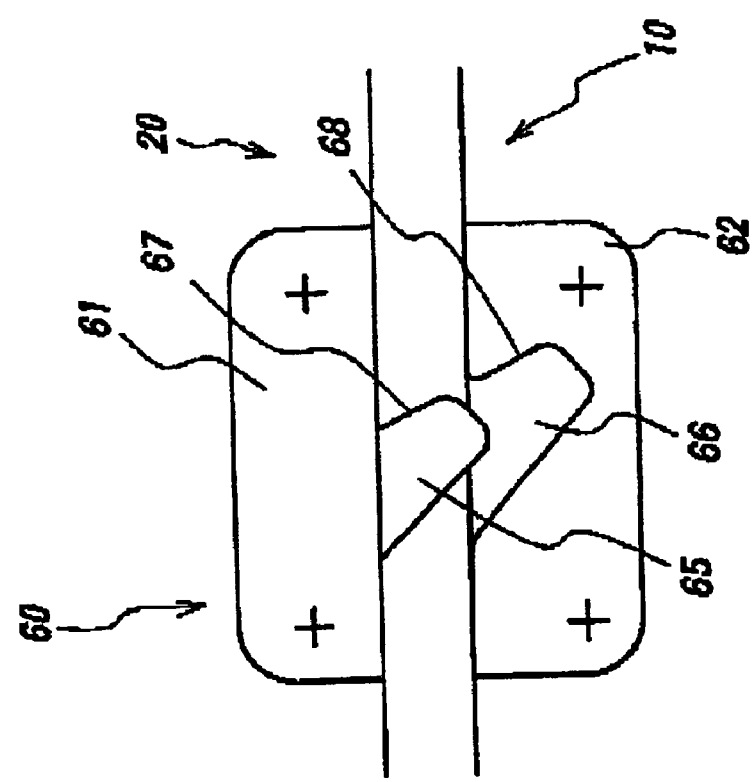

TIRE VULCANIZING MOLD

BACKGROUND OF THE INVENTION

1. Field of the Invention

The present invention relates to a vulcanizing mold for producing pneumatic tires.

2. Description of Related Art

In vulcanizing tires having deep grooves, there have been widely used so-called segmented molds. As generally know in the art, the segmented mold includes a plurality of mold segments that can be combined circumferentially with each other to define an inner surface for forming the entirety of the tread portion of the tire, as well as upper and lower side mold members for forming both side portions of the tire. The upper side mold member is secured to a top plate, and is movable axially of the mold, toward and away from the lower side mold member. The mold segments are arranged in, and slidingly engaged with a container ring so that they are moved radially inwards or outwards of the mold as the container ring is moved vertically downwards or upwards.

In such a segmented mold, the mold segments are each provided with an inner peripheral surface that extends over the entire width of the tread portion of the tire, and are moved radially outwards when the mold is opened to remove the vulcanized tire. Thus, the mold can be opened without interference between the ridges on the inner surface of the mold segment and corresponding grooves in the tread portion of the tire, thereby avoiding formation of defective tread portion. However, since the mold segment corresponds to the entire width of the tread portion, it is inevitable that the segment is relatively large and heavy. Moreover, in order to ensure that the mold segments are moved radially to precisely form the mold cavity without any inconvenience, the sliding-engagement surface of the container ring for guiding the mold segments must have a sufficient length. Thus, it is also inevitable that the container ring supporting the segments is large, resulting in increased size and cost of the mold as a whole.

When it is contemplated to use a segmented mold for producing particularly large tires, such as those for construction vehicles, it is often difficult to accommodate the mold in existing vulcanizing machine, and it is thus necessary to prepare an entirely new vulcanizing machine.

It is possible to vulcanize pneumatic tires having deep grooves in the tread portion, by using an ordinary vulcanizing mold, i.e., so-called two-split mold without segments and container ring, which can be readily accommodated in existing vulcanizing machine However, there is a serious problem that, when the vulcanized tire is removed from the vulcanizing mold, defective tread portion is caused due to interference between ridges on the inner surface of the mold and corresponding grooves in the tread portion. Thus, two-split mold cannot be used to produce large pneumatic tires with deep grooves in the tread portion.

SUMMARY OF THE INVENTION

It is an object of the present invention to eliminate the above mentioned problems of the prior art, and provide a vulcanizing mold which is compact and inexpensive, and which is capable of producing large tires having deep grooves in the tread portion while positively avoiding formation of defective tread portion.

According to the present invention, there is provided a vulcanizing mold for producing a pneumatic tire comprising a tread portion, wherein the tread portion comprises a center region which includes an equatorial plane of the tire, and outer regions on both sides of the center region, and wherein the center region and outer regions of the tread portion are bounded by two planes perpendicular to a center axis of the tire. The mold according to the present invention comprises a pair of side mold members arranged opposite to each other and movable at least axially of the mold toward each other to define part of a mold cavity in which a green tire is vulcanized, and away from each other to allow setting of a green tire into the mold cavity and removal of a vulcanized tire out of the mold cavity, wherein each side mold member has an inner peripheral surface provided with ridges corresponding to grooves in the outer region of the tread portion of a tire. The mold according to the present invention further comprises a plurality of distance piece arranged axially between the side mold members and movable radially of the mold, wherein the distance pieces are circumferentially combined with each other when they are moved radially inwards, to form an annular inner peripheral surface provided with at least one ridge corresponding to at least one groove in the center region of the tread portion of the tire. The ridges of the side mold members extend in parallel with each other, as seen in a developed view of the inner peripheral surface of the side mold member, and terminating at positions corresponding to a tread end of the tire so that the grooves formed by these ridges are opened in the tread end.

With the vulcanizing mold according to the present invention, the plurality of distance pieces are moved radially inwards and thereby combined with each other to provide an annular inner surface corresponding to the center region in the tread portion of the tire. Thus, by moving these distance pieces radially outwards upon opening the mold, the at least one ridge on the inner surface of the distance pieces can be separated radially away from the tire that has been vulcanized, without interfering with the tread portion of the tire.

Furthermore, the side mold member for the outer region of the tread portion has ridges corresponding to lug grooves of the tire, which is opened at the tread end of the. Thus, by moving the side mold members away from the tire in a direction along the lug grooves, it is possible to open the mold without interference of the ridges of the mold with the tire. In this way, the mold according to the present invention makes it possible to remove the vulcanized tire from the mold without interference between the ridges of the mold and the tire.

The distance pieces in the mold according to the present invention have a narrow and compact structure since they correspond exclusively to the center region of the tire. This makes it possible to realize a compact mechanism for moving the distance pieces, thereby providing a mold at a minimized size and cost comparable to those of conventional two-split mold.

The at least one ridge of the distance pieces may extend in circumferential direction of the mold to form at least one circumferential groove in the center region of the tread portion of the tire.

The ridges of the side mold members may each extend along a meridian of the tire. Alternatively, the ridges of the side mold members mat each extend helically about a center axis of the tire, with a predetermined pitch.

It is preferred that the mold further comprises guide means for guiding the movement of the side mold members away from each other when opening the mold, and positioning the side mold members relative to each other when closing the mold In this way, the relative position of both side mold members is accurately defined by the guide means upon closing the mold, thereby precisely forming the mold cavity of a predetermined shape. Further, the side mold members are properly guided and separated from each other along the direction of the ridges on the inner perpheral surface of one of the side mold members, upon opening the mold. Thus, the side mold members can be separated from the tire without applying undesirable stresses to the tire, thereby positively preventing damages to the tire or formation of defective tread portion. The ridges of the side mold members are provided such that they are drawn out along the corresponding lug grooves of the tire when the side mold member is separated from the tire. However, there is applied a larger separating force to the tire, at least in the initial stage of the mold opening. In the absence of the guide means, the lug grooves of the tire would have to guide the side mold members against such larger force, thereby applying substantial force to the tread portion of the tire and forming defective tread portion, as the case may be. Provision of the guide means makes it possible to eliminate or mitigate stresses applied to the tire, so that damage of blocks are rarely caused.

It is preferred that the guide means comprises at least one wedge provided for one of the side mold members, and at least one notch provided for the other of the side mold members, said wedge being engageable with said notch. In this instance, it is readily possible to realize a simple and reliable structure of the guide means.

It is preferred that the mold according to the present invention further comprises biasing means for normally biasing said distance pieces radially outwards. In this way, it is unnecessary to separately provide actuator means, such as air cylinders, for moving the distance pieces radially outwards when the mold is opened and the vulcanized tire is removed, so that the mold can be made more compact.

It is preferred that the distance pieces are engageable with one of the side mold members so that the distance pieces are moved radially of the mold upon axial movement of that side mold member. In this instance, the side mold member may have a cam surface engaged by the distance pieces so that the distance pieces are moved radially inwards as the mold member is moved axially toward the other side mold member.

BRIEF DESCRIPTION OF THE DRAWINGS

The present invention will now be explained in further detail hereinafter, with reference to a preferred embodiment shown in the accompanying drawings.

FIG. 3 is a plan view showing attachment of distance pieces.

FIGS. 4a and 4b are sectional views taken along line IV–IV' of FIG. 3.

FIGS. 6a and 6b are front view and side view showing the guiding means.

DETAILED DESCRIPTION OF THE PREFERRED EMBODIMENT

Figure 1A:
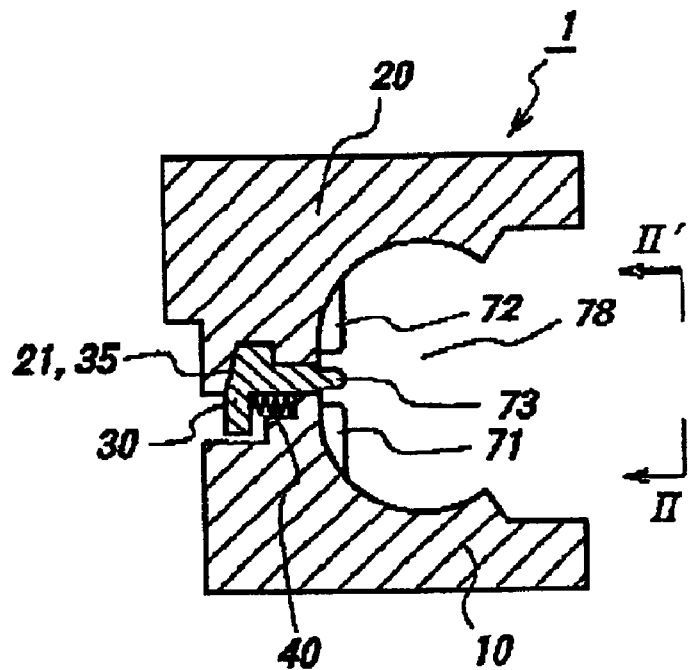
FIGS. 1a and 1b are sectional views showing an embodiment of the vulcanizing mold according to the present invention.
Figure 1B:
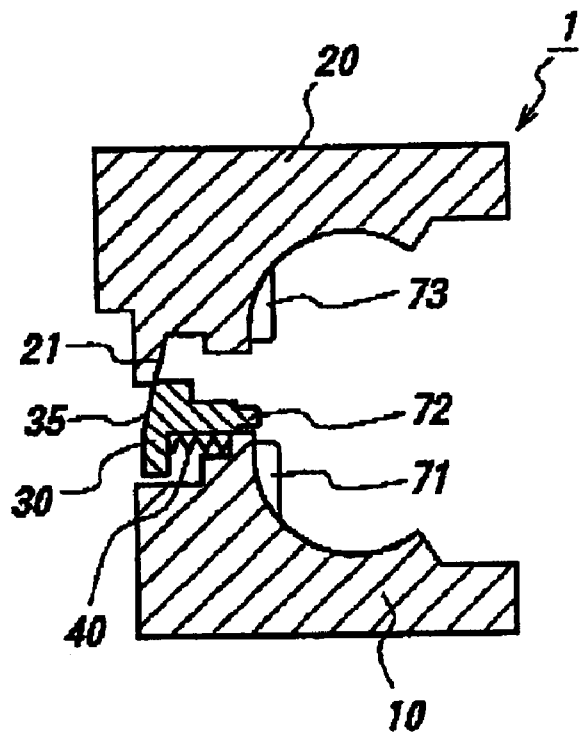

Referring now to the drawings, there is shown a tire vulcanizing mold 1 according to the present invention is in FIGS. 1a and 1b in its closed state and open state, respectively. The mold 1 includes a lower side mold member 10, an upper side mold members 20 and a plurality of distance pieces 30, which are combined with each other to define a mold cavity 78 for vulcanizing a green tire, not shown. It is assumed that the tire to be produced by the vulcanizing mold according to the present invention has a tread portion that includes a center region and outer regions on both sides of the center region. The lower and upper side mold members 10, 20 form the outer regions of the tread portion and sidewalls of the tire, while the distance pieces 30 form the center region of the tread portion.

The lower side mold member 10 has an annular shape and is a stationary member. The upper side mold member 20 has an annular shape and is arranged opposite to the lower side mold member 10 so as to be movable axially of the mold, toward and away from the lower side mold member 10. The upper side mold member 20 is moved axially of the mold 1 toward the lower side mold member 10 for closing the mold 1 and vulcanizing a green tire in the mold cavity 78. The upper side mold member 20 is moved axially of the mold 1 away from the lower side mold member 10 for opening the mold 1 and removing a vulcanized tire from the mold cavity 78 or setting a new green tire into the mold cavity 78. The distance pieces 30 are movable radially of the mold 1, and assembled circumferentially with each other when they are moved radially inwards, thereby forming an annular inner surface.

Figure 2:
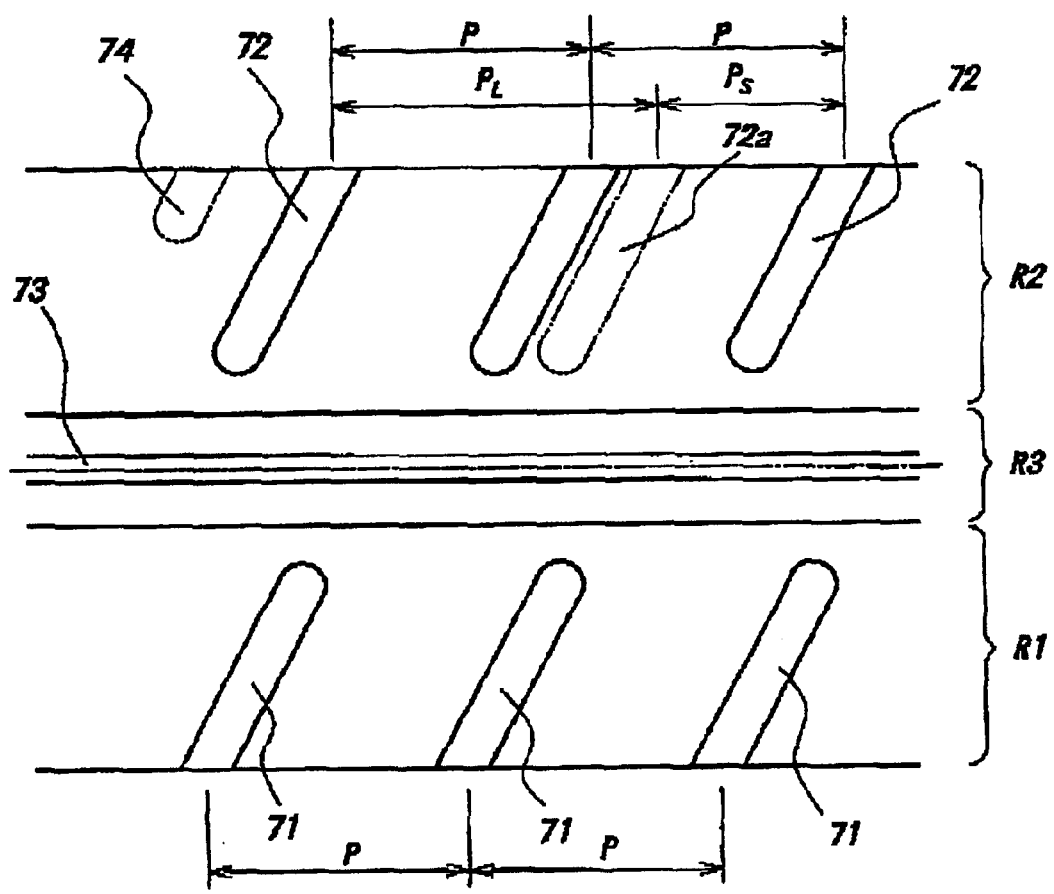
FIG. 2 is a developed view showing part of the inner peripheral surface of the mold.

FIG. 2 is a developed view showing the inner peripheral surface of the mold 1, as seen in the direction of arrows II, II' in FIG. 1a. The inner peripheral surface of the mold 1 is formed of inner surfaces R1, R2 of the side mold members 10, 20 corresponding to the opposite outer regions of the tread portion, respectively, and an inner peripheral surface R3 of the distance pieces 30 corresponding to the center region of the tread.

The inner surfaces R1, R2 of the lower side mold member 10 and upper side mold member 20 have ridges 71, 72, respectively, corresponding to lug grooves which are helically oriented about the center axis of the tire at the same inclination angle relative to the equatorial line, and extend in parallel with each other, as seen in the developed view of FIG. 2, so as to open at the tread ends, respectively. While the ridges 72 are shown as being arranged at a constant circumferential pitch P, it is sufficient for these ridges 71, 72 to have the same inclination angle. Thus, there may be included a ridge 72a spaced from adjacent ribs 72 by distances $P_L$, $P_S$ that are different from the above-mentioned constant pitch P of the other ridges, and/or a ridge 74 located at a position shifted in the width direction of the tire.

The annular inner surface formed by the distance piece 30 has at least one ridge 73, which corresponds to at least one groove in the center region of the tread portion of the tire. This groove may be a circumferential groove as shown, or inclined groove that is not connected to the lug grooves in the outer region of the tread portion.

As shown in FIGS. 1a and 1b, the lower side mold member 10 is provided with biasing means 40 for normally biasing the distance pieces 30 radially outwards. The upper side mold member 20 is provided with a cam surface 21 for abutting onto corresponding cam follower surfaces 35 of the distance pieces 30 so as to apply a force overcoming the biasing force of the biasing means 40 and thereby moving the distance pieces 30 radially inwards, so that the distance pieces 30 forming the annular shape are brought into contact with each other in circumferential direction to form part of the mold cavity 78. Such a closed state of the mold 1 is shown in FIG. 1a.

FIG. 1b shows the mold in its opened state, wherein the upper side mold member 20 has been raised, with the distance pieces 30 moved radially outwards under the biasing force of the biasing means 40.

FIG. 3 is a plan view showing the manner of attaching the distance pieces 30 to the lower side mold member 10. Each distance piece 30 has an arcuate shape obtained by equiangularly dividing an annular member into a plurality of pieces, e.g., into eight pieces to have a center angle of 45 degrees. The cam follower surface 35 of the distance piece 30 abutting with the can surface 21 of the upper side mold member 20 is formed of a flat surface provided at section L in the central portion of each distance piece 30. Each distance piece 30 is provided with two radial guides 50 and two urging means 40.

FIG. 4a is a sectional view of the mold in its closed state, wherein the upper side mold member 20 and the distance pieces 30 assume the lowermost position and the innermost positions, respectively, after the upper side mold member 20 has been lowered and the distance pieces 30 has been thereby moved radially inwards due to the sliding contact of the cam surface 21 of the upper side mold member 20 with the cam follower surface 35 of the distance pieces 30, respectively. Each distance piece 30 has an outer edge portion 33 provided with a hole 31. A guide pin 42 is slidingly engaged with the hole 31 and threaded into the lower side mold member 10. Thus, the guide pin 42 positively guides the distance piece 30 as it is moved radially outwards or inwards. Furthermore, a compression coil spring 41 is arranged about the guide pin 42 between the radially inner surface 34A of the outer edge portion 33 and the opposite surface of the lower side mold member 20.

FIG. 4b shows the closed state of the mold 1 wherein the upper side mold member 20 has been raised and each distance piece 30 is positioned at the outermost position. The spring 41 causes the associated distance piece 30 to be moved radially outwards, until the radially outer surface 34B of the outer edge portion 33 comes into abutment with, and stopped by a stopper surface 45 which is in the form of a head of the guiding pin 42.

Figure 5A:
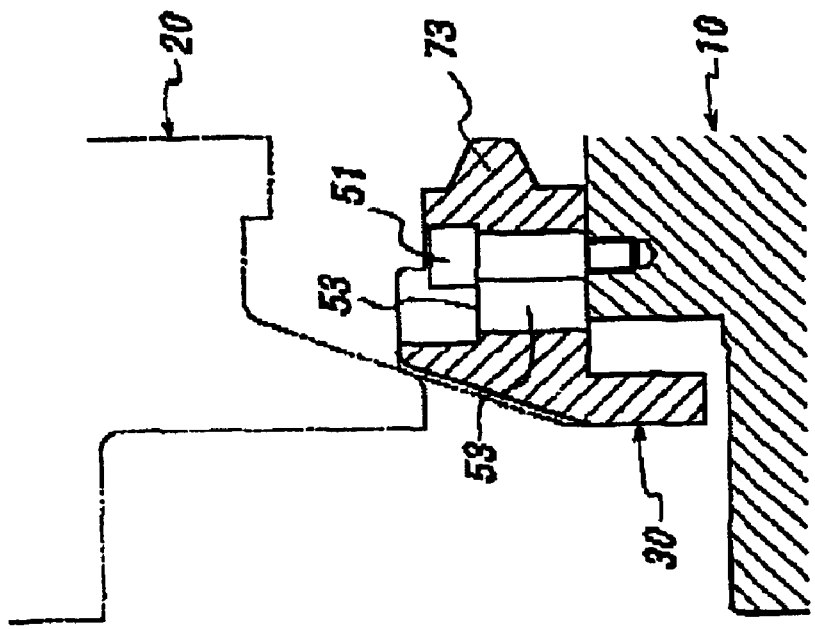
FIGS. 5a and 5b are sectional views taken along line V–V' of FIG. 3.
Figure 5B:
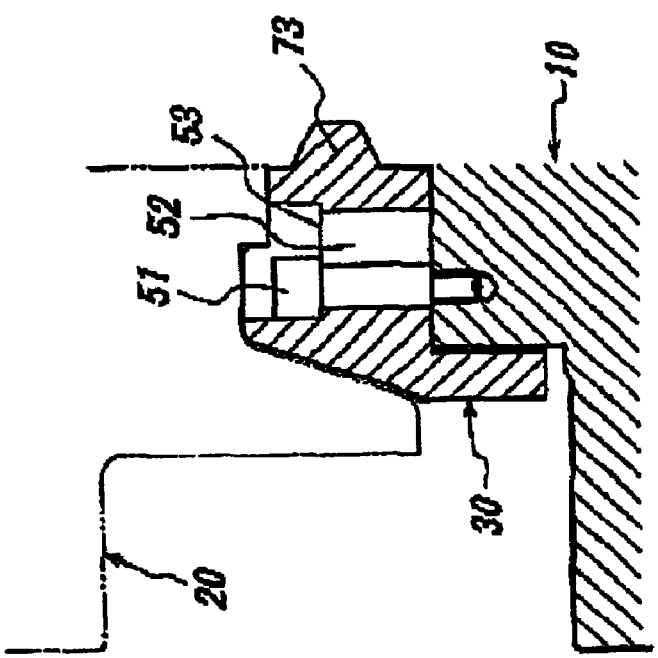

FIGS. 5a and 5b are sectional view showing the closed state and the open state of the mold 1, respectively. As shown in FIG. 5a, each distance piece 30 is provided with an elongated guide hole 52 that extends radially of the mold 1, and the lower side mold member 10 is provided with a pin 51 slidingly engaged with the guide hole 52. The guide hole 52 has a stepped surface 53, while the pin 51 has a head that is engaged with the stepped surface 53 to prevent upward movement of the distance piece 30 away from the lower side mold member. In the closed state of the mold shown in FIG. 5a, the pin 51 is positioned at the radially outermost position of the guide hole 52. The sliding engagement between pin 51 and the guide hole 52 forms an additional guide means for the distance pieces 30, when the distance pieces 30 are moved radially outwards or inwards. In the open state of the mold 1 as shown in FIG. 5b, each distance piece 30 has been moved to the radially outermost position, and the pin 51 is positioned at the radially innermost position of the guide hole 52.

When the mold 1 is closed, it is necessary for the upper side mold member 20 to be duly positioned relative to the lower side mold member 10. Furthermore, in order to avoid formation of defective tread portion during the opening of the mold 1, it is necessary for the upper side mold member 20 to be fully separated from the vulcanized tire along the helically spirally inclined ridges 72 on the inner surface of the upper side mold member 20. In addition, since the tire is still maintained engaged with the lower side mold member 10, it is necessary for the upper side mold member 20 to be helically separated from the lower side mold member 10. For these reasons, it is desirable to provide the upper side mold member 20 and lower side mold member 10 with guide means 60 for guiding the relative axial movement of the side mold members 10, 20. Provision of such guide means 60 ensures to eliminate or substantially mitigate stresses that would be otherwise applied to the walls of the lug grooves in the tire when the ridges 72 of the upper side mold member 20 are moved along, and guided by the lug grooves, and to thereby positively prevent formation of defective tread portion in the tire.

One preferred example of such guide means 60 is shown in FIGS. 6a and 6b, wherein the upper side mold member 20 is provided with a wedge member 61 having a wedge 65, and the lower side mold member 10 is provided with a notched member 62 having a notch 66 that corresponds to the wedge 65. When the upper side mold member 20 is lowered toward the lower side mold member 10, the wedge 65 is engaged with the associated notch 66, thereby allowing the side mold members 10, 20 to be positioned relative to each other.

The wedge 65 of the upper side mold member 20 has an upper edge 67, which undergoes a sliding movement relative to an inclined upper surface 68 of the notch 66, when the upper side mold member 20 Is raised away from the lower side mold member 10. The upper surface 68 of the notch 66 extends in parallel with the ridges 72. It is thus possible to raise the upper side mold member 20 away from the lower side mold member 10 while causing the upper side mold member 20 to rotate along the ridges 72.

A vulcanizing method using the above-mentioned mold 1 will be explained hereinafter. It is assumed that a green tire fitted with a bladder 7 therein is set on the lower side mold member 10. The upper side mold member 20 is lowered toward the lower side mold member 10, so that the distance pieces 30 are moved radially inwards by the contact of the cam surface 21 of the upper side mold member 20 with the cam follower surface 35 of the distance piece 30, to thereby form the closed mold cavity 78. On his occasion, the relative positioning between the side mold members 10, 20 is achieved by the wedge 65 and notch 66. In such a state, the lower side mold member 10 and upper side mold member 20 are locked with each other. The mold 1 accommodating the green tire is transferred to a vulcanizing machine by a hoist 80, and the lid of the vulcanizing machine is closed.

Figure 7A:
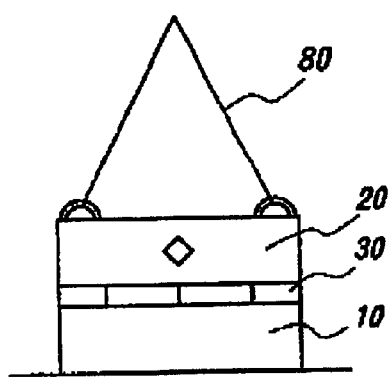
FIGS. 7a through 7e are explanatory views showing the method for manufacturing pneumatic tires according to the present invention.

The successive steps of the vulcanizing method will be described below with reference to FIGS. 7a through 7e. After completing vulcanization of the green tire, the mold 1 is removed out of the vulcanizing machine and placed on a table, and the locking between lower side mold member 10 and upper side mold member 20 is released. This state is shown in FIG. 7a.

Figure 7B:
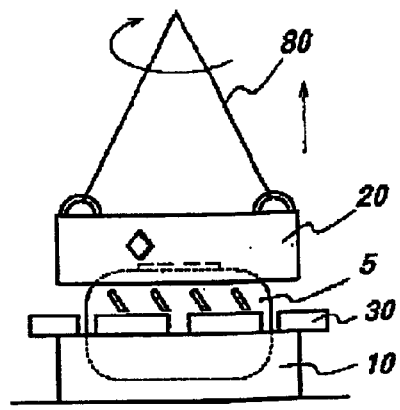

With reference to FIG. 7b, when the upper side mold member 20 is lifted by the lifting device 80, the distance pieces 30 are moved radially outwards by the biasing means 40, and the upper side mold member 20 is raised away from the lower side mold member 10 while being rotated along ridges 72 on the inner surface of the upper side mold member 20, by the above-mentioned engagement of the wedge 65 and notch 66. Thus, the upper side mold member 20 can be separated away from the vulcanized tire 5 without causing the ridges 72 to interfere with the tire 5, thereby positively avoiding formation of defective tread portion in the tire.

Figure 7C:
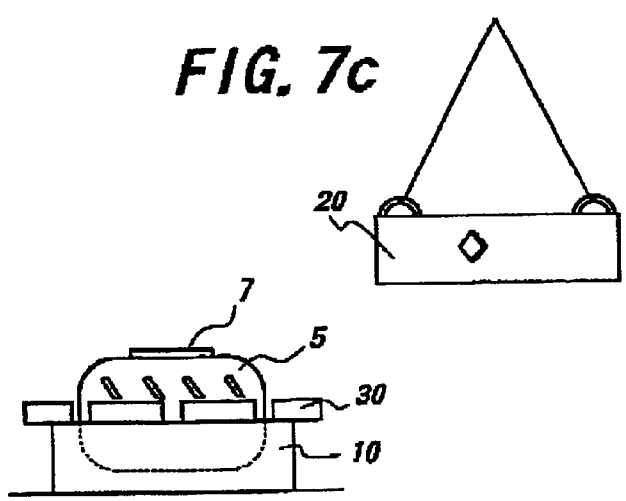
Figure 7D:
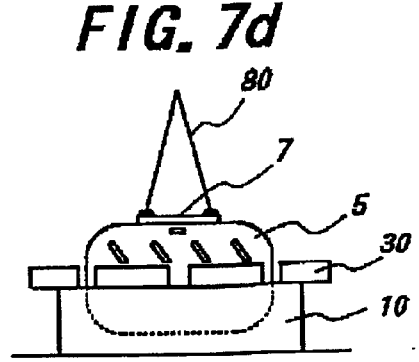

Subsequently, as shown in FIG. 7c, the upper side mold member 20 is moved from the above of the table toward another place. The tire 5 and the lower side mold member 10 are left engaged with each other on the table, as shown in FIG. 7d.

Figure 7E:
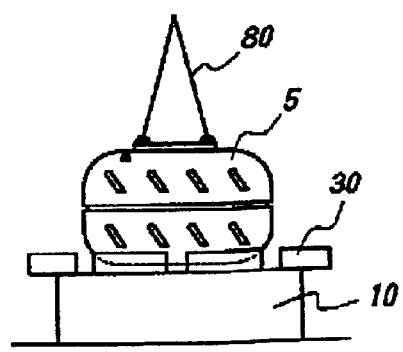

Finally, as shown in FIG. 7e, the tire is lifted by holding the bladder ring 7 of the bladder that is fitted with the inner surface of the tire 6. On this occasion, the eight distance pieces 30 provided with the ridges 73 corresponding to the grooves at the center region of the tread portion have already been separated from the tire 5. Moreover, as mentioned above, the lug grooves in the outer regions of the tread portion of the tire 5 in engagement with the ridges 71 of the lower side mold member 10 are opened to the tread end. Thus, by lifting and simultaneously rotating the tire 5, the tire 5 can be moved helically and away from the lower side mold member 10, without causing defective tread portion.

It will be appreciated from the foregoing description that, according to the present invention, the interference of the lug grooves of the tire with the corresponding ridges of the mold is positively avoided by a unique arrangement wherein the side mold members are opened along the lug grooves. Moreover, the groove in the center region of the tread portion are formed by the ridge provided for the distance pieces that can be moved radially outwards when the mold is opened. It is thus possible to provide an improved mold, which can be made to have a compact size and at relatively low cost comparable to those of a two-split mold.

While the present invention has been described above with reference to some preferred embodiments, they were presented by way of examples only, and various changes or modifications may be made without departing from the scope of the invention as defined by the appended claims.

What is claimed is:

1. A vulcanizing mold for producing a pneumatic tire comprising a tread portion, said tread portion comprising a center region which includes an equatorial plane of the tire, and outer regions on both sides of the center region, said center region and said outer regions of the tread portion being bounded by two planes perpendicular to a center axis of the tire, wherein said mold comprises:

a pair of side mold members arranged opposite to each other and movable at least axially of the mold toward each other to define part of a mold cavity in which a green tire is vulcanized, and away from each other to allow setting of a green tire into the mold cavity and removal of a vulcanized tire out of the mold cavity, said side mold members each having an inner peripheral surface provided with ridges corresponding to grooves in the outer region of the tread portion of a tire;

a plurality of distance pieces arranged axially between the side mold members and movable radially of the mold, said distance pieces being circumferentially combined with each other when they are moved radially inwards, to form an annular inner peripheral surface provided with at least one ridge corresponding to at least one groove in the center region of the tread portion of the tire;

said ridges of the side mold members extending in parallel with each other, as seen in a developed view of the inner peripheral surface of the side mold member, and terminating at positions corresponding to a tread end of the tire so that the grooves formed by these ridges are opened in the tread end; and guide means for guiding the movement of the side mold members away from each other when opening the mold, and positioning the side mold members relative to each other when closing the mold.

2. A vulcanizing mold according to claim 1, wherein said at least one ridge of the distance pieces extends in circumferential direction of the mold to form at least one circumferential groove in the center region of the tread portion of the tire.

3. A vulcanizing mold according to claim 1, wherein said ridges of the side mold members each extend along a meridian of the tire.

4. A vulcanizing mold according to claim 1, wherein said ridges of the side mold members each extends helically about a center axis of the tire, with a predetermined pitch.

5. A vulcanizing mold according to claim 1, wherein said guide means comprises at least one wedge provided for one of the side mold members, and at least one notch provided for the other of the side mold members, said wedge being engageable with said notch.

6. A vulcanizing mold according to claim 1, wherein said distance pieces are engageable with one of the side mold members so that the distance pieces are moved radially of the mold upon axial movement of said one side mold member.

7. A vulcanizing mold according to claim 6, wherein said one side mold member has a cam surface engaged by said distance pieces so that said distance pieces are moved radially inwards when said one side mold member is moved axially toward the other of the side mold member.

8. A vulcanizing mold according to claim 7, further comprising biasing means for normally biasing said distance pieces radially outwards.

9. A vulcanizing mold according to claim 6, wherein the other of said side mold members comprises guide means for guiding the radial movement of the distance pieces, and biasing means for biasing said distance pieces radially outwards.

* * * * *